(12) United States Patent
Mickelsen

(10) Patent No.: US 9,460,093 B2
(45) Date of Patent: Oct. 4, 2016

(54) DYNAMIC MEDIA CONTENT

(71) Applicant: EchoStar Technologies L.L.C., Englewood, CO (US)

(72) Inventor: Jeremy Mickelsen, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 190 days.

(21) Appl. No.: 13/780,492

(22) Filed: Feb. 28, 2013

(65) Prior Publication Data

US 2014/0244636 A1     Aug. 28, 2014

(51) Int. Cl.
*G06F 17/30* (2006.01)
*G06F 7/00* (2006.01)

(52) U.S. Cl.
CPC ............... *G06F 17/30038* (2013.01)

(58) Field of Classification Search
None
See application file for complete search history.

(56) References Cited

U.S. PATENT DOCUMENTS

| | | | |
|---|---|---|---|
| 6,944,585 B1* | 9/2005 | Pawson | G06F 17/30035 348/14.01 |
| 8,752,085 B1* | 6/2014 | Brueck | H04L 65/601 725/32 |
| 2007/0204310 A1* | 8/2007 | Hua et al. | 725/88 |
| 2008/0004957 A1* | 1/2008 | Hildreth | G06Q 30/0267 705/14.64 |
| 2009/0328113 A1* | 12/2009 | van de Klashorst | G06Q 30/00 725/87 |
| 2011/0197224 A1* | 8/2011 | Meijer | G06Q 30/02 725/34 |
| 2011/0321086 A1* | 12/2011 | Buchheit | H04N 21/23424 725/34 |

* cited by examiner

*Primary Examiner* — Sangwoo Ahn
(74) *Attorney, Agent, or Firm* — Bejin Bieneman PLC

(57) ABSTRACT

Data associated with a user is collected from one or more remote sites. A first set of media data is received from a media content source. Metadata related to the media data is stored. An association is made between the data associated with the user and the metadata. In a computing device that includes a processor and a memory, the first set of media data is modified based at least in part on the association between the data associated with the user and the metadata.

21 Claims, 4 Drawing Sheets

DYNAMIC MEDIA CONTENT

BACKGROUND

Consumers of media content, such as audio and/or video content, may have different viewing preferences from one another. For example, one consumer may be fond of content featuring frightening or violent scenes. Such content may be displeasing to another consumer. Some consumers may only want to view content having happy endings. Others may prefer content having more "realistic," i.e., ambiguous, endings. Similarly, a consumer may be particularly fond of a character in a movie or television series, where other consumers dislike that character. Such examples abound. Unfortunately, present content delivery systems are deficient in identifying user interests and inclinations related to media content. Further, present content delivery systems lack mechanisms for modifying content in accord with user interests and inclinations.

DRAWINGS

FIG. 1 a block diagram of an exemplary content delivery system.

DETAILED DESCRIPTION

Media content, e.g., a video presentation such as a movie or a television program, may be modified before, or during, a presentation on a display device. Modifications are generally made based on metadata included in the media content and collected data relating to a content user. User data may be collected from one or more social media sites. Accordingly, user interests and tastes may be accounted for to provide an enhanced viewing experience. A same media content item, e.g., a movie, may include and/or omit different content segments when presented according to collected user data for different users.

System Overview

Figure 1:
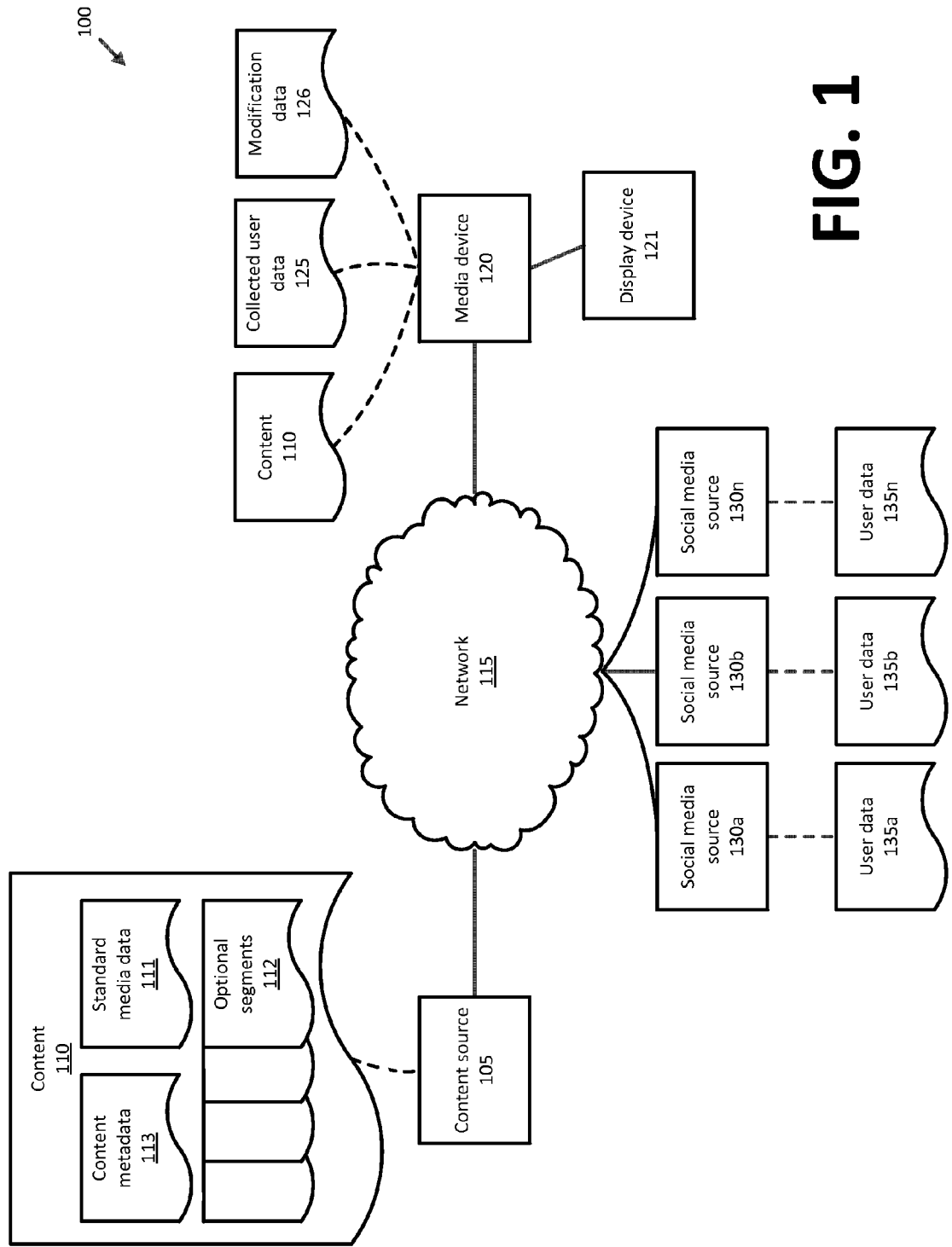

FIG. 1 is a block diagram of an exemplary content delivery system 100. A media content source 105 stores media content 110. The media content 110 generally includes a first set of media data, referred to as standard content 111, and may also include a second set of media data, referred to as optional segments 112. Further, content metadata 113 for the standard content and/or the segments 112 is generally included in the media content 110, although, as explained below, some or all of the metadata 113 could be provided separately from the content 110.

The content 110 may be provided via a network 115 to a media device 120. Further, the content 110 may be displayed to a user via the media device 120 and/or a media display device 121 such as a television, video monitor, or the like. When content 110 is referred to herein as being "displayed" it is to be understood that such display could include any possible mode of displaying media data, such as a display of visual data, audio data, etc. For example, content 110 could be displayed by showing video or image data on a screen with or without sound, by playing audio data with or without a visual display, etc.

Collected user data 125 and content metadata 113, stored in a computer-readable medium included in or accessible by the media device 120, may be used to generate modification data 126. The collected user data 125 may be gathered by accessing remote user data 135 that is available from one or more social media sources 130a . . . 130n, or some other remote site, e.g., some other site accessed via the network 115. That is, although social media sources 130 are discussed in connection with the examples provided herein, other remote user data could be accessed to obtain user data 135 for collected data 125. For example, instead of a social media source 130, user data 125 could be collected using one or more of remote user data 135 for an e-commerce site, a news site, investment sites (for example to tailor news coverage to relevant articles), search engine history, fan forum/Bulletin Board Service (BBS), sites providing reference information, etc. In any case, remote user data such as data 135 could be collected by accessing a user's account, e.g., a user's account for a social media source 130. Further, remote user data 135 could be accessed according to a user's other information, for example a username or handle under which a user has made comments on Twitter (i.e., tweets), posted reviews on a review web site or e-commerce web site, etc. And in any event, remote user data 135 may include data related to user activity, such as posts, tweets, messages, etc.

Modification data 126 may be used to determine whether to modify the standard content 111, including whether to insert some or all of the optional segments 112, prior to, or during, display of an item of media content 110. Accordingly, modification data 126 may be used to identify a portion or portions of standard content 111 to be deleted, augmented, and/or replaced. In general, the content 110 displayed via the devices 120 and/or 121 may include some or all of the standard content 111 and/or one or more optional segments 112.

Exemplary System Elements

The media content source 105 may be any one, or some combination, of various mechanisms for delivering media content 110, and may depend on a type of media content 110 being provided. By way of example and not limitation, media content 110 data may be provided as video-on-demand through a cable, satellite or internet protocol television (IPTV) distribution system, as streaming Internet video data, or as some other kind of data. Further for example, the media content source 105 could be a computer readable medium included in or accessible by the media device 120, e.g., an optical disc such as a DVD (sometimes referred to as a digital video disk) or Blu-ray™ disc, etc. In general, examples of media content 110 include various types of data, including audio, video, images, etc. Accordingly, examples of content sources 105 may include one or more of a cable or satellite television head end, a video streaming service such as generally includes a multimedia web server (or some other computing device), or some other mechanism for delivering multimedia data.

The network 115 represents one or more mechanisms for delivering content 110 from a content source 105 to a media device 120. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Media content 110 is generally delivered via the network 115 in a digital format, e.g., as compressed audio and/or video data. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-2 or the H.264/MPEG-4 Advanced Video Coating standards (AVC) (H.264 and MPEG-4 at present being consistent), or according to some other standard or standards. For example, media content 110 could be audio data formatted according to standards such as MPEG-1 or MPEG-2 Audio Layer III (MP3), Advanced Audio Coding (AAC), etc. Further, the foregoing standards generally include support for metadata, such as the metadata 113 discussed herein. Content 110 that using a standard or standards that do not explicitly include provisions for metadata, or standards that have limitations on metadata size, may be supplemented with discrete metadata 113 (e.g. separate files) which uses either embedded metadata 113 or information such as timecodes/time stamps/timing intervals which can be used to modify the standard content 111.

Standard content 111, together with metadata 113 related to the standard content 111, generally includes portions of an item of media content 110 provided for general distribution. That is, standard content 111 is provided without regard to any instructions for customization or tailoring, e.g., such as may be performed using modification data 126. For example, standard content 111 may present a movie, television program, video file, audio file, etc. in an original and unmodified form.

Optional segments 112 are portions of media content 110 that may be inserted into standard content 111. For example, an optional segment 112 may include content related to standard content 111, such as an outtake, extra scene, alternative scene, etc. Therefore, an optional segment 112 may be appropriate for insertion into standard content 111 at a certain location or locations in the standard content 111. Further, the optional segment 112 could replace a portion of standard content 111 at a specified location or locations. Alternatively or additionally, the optional segment could augment the standard content 111, i.e., it could be inserted into the standard content 111 at a specified location without replacing any of the standard content 111. Further, more than one optional segment 112 could be inserted into standard content 111 at a specified location or locations, e.g., two optional segments 112 could be inserted into standard content 111 at a specified location in a specified sequence. Likewise, different optional segments 112 could be inserted into an item of standard content 111 at different respective locations in the standard content 111.

A given segment 112 could be associated with more than one item of content 110, just as an item of content 110 could include more than one segment 112. Although depicted in FIG. 1 as being included in an item of content 110, segments 112 could alternatively or additionally be stored separately from the content 110. For example, the content 110, e.g., in metadata 113, could include pointers, file paths, time codes, uniform resource locators, or other indicators of a location where associated optional segments are stored. Further for example, information about an optional segment 112 related to an item of content 110, including information sufficient for retrieving the segment 112 from a local or remote storage location, could be stored in a data structure not included in a content 110. In this instance, a table, file, etc., could identify an association between an item of media content 110 and an optional segment 112. Further, such data structure could identify multiple associations between items of media content 110 and optional segments 112.

Content metadata 113 generally includes indexes, pointers, or other mechanisms for identifying locations in media content 110, e.g., a stream of standard content 111. Such location-identifying mechanisms may be used with other content metadata 113 to identify locations in standard content 111 for modification of the standard content 111 based on modification data 126. As stated above and detailed further below, modification data 126 may be generated by using collected user data 125 and the content metadata 113.

Figure 2:
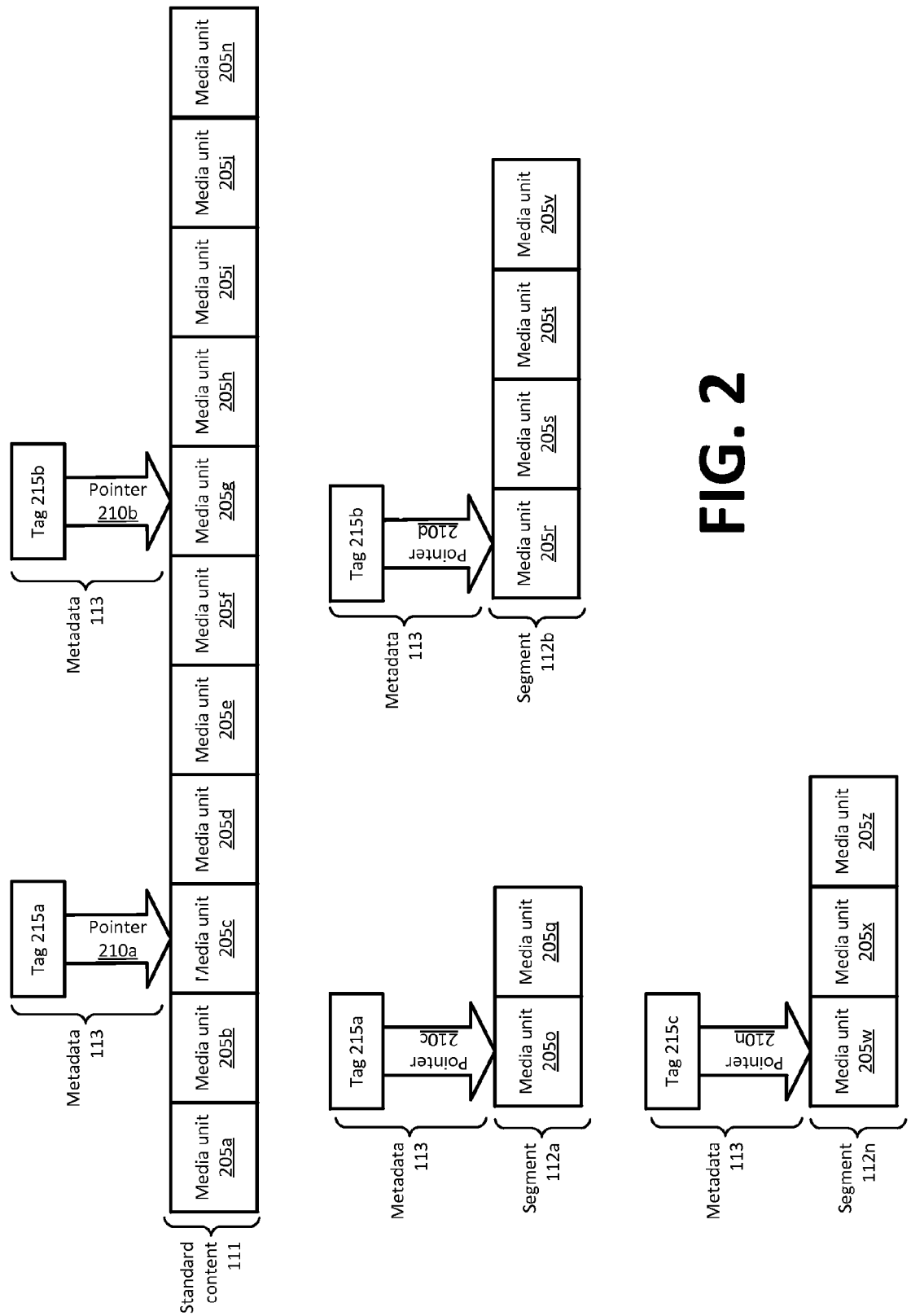
FIG. 2 is a block diagram of exemplary media content metadata.

Content metadata 113 may be implemented in various ways. FIG. 2 is a block diagram of exemplary metadata 113 providing information about standard content 111. Standard content 111 may include a plurality of media units 205a . . . 205n, e.g., frames or the like in a stream of compressed media data formatted according to the MPEG standard or the like. Pointers 210 in metadata 113 associate tags 215 in the metadata 113 with media units 205. Thus, metadata tags 215 are associated with locations in the standard content 111. For example, FIG. 2 shows tags 215a and 215b respectively associated with pointers 210a and 210b, the pointers 210a and 210b pointing respectively to media units 205c and 205g. Further, optional segments 112a . . . 112n include media units 205, e.g., as seen in FIG. 2, respective media units being associated with respective pointers 210c . . . 210n.

The tags 215 generally describe attributes of a portion or all of the standard content 111 and/or optional segments 112. A tag 215 could include virtually any descriptive information related to some or all of the content 111 and/or segments 112, such as a rating (e.g., critical, e.g., 4 stars, or maturity level, e.g., PG-13), a genre (e.g., romance, slapstick, etc.), featured characters, featured actors, geographic locations, musical titles, etc. For example, tags 215 could include words or phrases describing an indicated portion of the standard content 111, e.g., describing a scene such as "violent," "love scene," etc. Further, a tag 215 might include attributes, e.g., "begin" and "end" indicating a beginning and an end of a portion of standard content 111 associated with a tag 215 description, e.g., "violent," "love scene," etc.

As also seen in FIG. 2, pointers 210 can associate tags 215 with optional segments 112. Accordingly, when a tag 215 indicated in metadata 113 associated with standard content 111, e.g., via a pointer 210, matches a tag 215 indicated in metadata 113 associated with a segment 112, the indicated segment 112 may be inserted into the standard content 111 at a location or locations indicated by the pointer 210. For example, tags 215a and 215b in metadata 113 for standard content 111 may occur in metadata 113 for respective segments 112a and 112b, the metadata 113 for the segments 112a and 112b also including pointers 210c and 210d, respectively, thus providing a mechanism for inserting the segments 112a and 112b into the standard content 111.

Alternatively or in addition to the example of FIG. 2, Table 1 provides an example of certain content metadata 113 that may be included with an item of media content 110, or that could be provided to the media device from a separate file, and even from a source other than the media content source 105. In any case, as stated above, the metadata 113, along with collected user data 125, may be used for generating modification data 126. Other table formats are possible, such as organizing by Segment ID, or by using "linked lists" of content for each location where optional content 112 may be placed, to name a few examples.

TABLE 1

| Segment ID | Start Index | End Index | Tag |
|---|---|---|---|
| ABC | 010201 | 012201 | Luke Skywalker |
| ABC | 010201 | 012201 | Chewbacca |
| BCD | 012201 | 012201 | Music filler |
| CDEF | 119281 | 139181 | Violent |
| BCD | 139181 | 139181 | Music filler |
| DJK | 173898 | 173898 | Light saber |
| EYT | 173898 | 173898 | Princess Leia |
| FDC | 208767 | 230983 | Happy ending |
| GHJK | 208767 | 230983 | Ambiguous ending |
| NULL | 175002 | 181221 | Gory |
| NULL | 190211 | 200101 | Romantic |

The metadata 113 may include an identifier for, or pointer to, an optional segment 112, along with starting and ending locations, e.g., indices, in the standard content 111. Further, the metadata 113 may include tag 215 data associated with the specified segment 112. Thus, as seen in Table 1, the tag 215 "Chewbacca" may be associated with a segment 112 having the identifier "ABC." Further, this segment 112 is appropriate to replace units 205 of standard content 111 starting at index number 010201 and ending at index number 012201. Accordingly, as explained further below, if collected user data 125 indicates that the user is interested in scenes featuring the character Chewbacca, the segment 112 specified by the segment identifier ABC could be inserted into an item of standard content 111 at a location indicated by the provided starting and ending indices.

As can be seen in Table 1 with reference to the segment 112 identifier ABC, a segment 112 may have multiple tags 215 associated with it. Conversely, although not shown, a tag 215 could be used to describe multiple segments 112. Further, as can be seen with reference to the segment 112 identifier BCD, a segment 112 may be appropriate for association with more than one location in standard content 111. In addition, as can be seen with reference to the segment 112 identifiers FDC and GHJK, multiple optional segments 112 may be appropriate for association with a same portion of standard content 111. In general, segments 112 can be inserted into standard content 111 in any order or combination specified by modification data 126, which modification data 126 may be generated by using, at least in part, metadata 113.

Segment 112 identifiers for the last two exemplary records of Table 1 are indicated to be null values. A null segment 112 identifier indicates content metadata 113 for a portion of standard content 111, although no segment 112 is associated with the portion of standard content 111. The system 100 may use metadata 113 about portions of standard content 111 to delete and/or replace the portions of standard content 111 even if no optional segment 112 can be associated with the portion of standard content 111.

Collected user data 125 generally includes information, e.g., tags or the like, indicating attributes of media content 110 likely to enhance a user experience. Moreover, collected user data 125 generally includes user data 135 from one or more social media sources 130 or other remote sites. A process for generating collected user data 125 is discussed in further detail below with respect to FIG. 4. Further, an example of collected user data 125 is provided in Table 2.

TABLE 2

| UserID | Tag |
|---|---|
| 0001 | Chewbacca |
| 0001 | Star Wars |
| 0001 | Jean-Luc Picard |
| 0001 | William Shatner |
| 0001 | Action |
| 0002 | Jane Austen |
| 0002 | Romance |
| 0002 | Downton Abbey |
| 0002 | Upstairs Downstairs |
| 0002 | NOT gory |

As can be seen in table 2, collected user data 125 may include various tags 215 associated with user identifiers. In general, a media device 120 may be used by one or more users. Media content 110 may be modified differently for different users, as illustrated by the fact that different tags 215 are provided for different users in Table 2.

Tags 215 can indicate either that a user wants to consume or that a user does not want to consume content 110 associated with the tag 215. For example, in Table 2 the tag "not gory" indicates that user 0002 wants to avoid gory content. Other indicators of positive or negative user associations with a tag 215 could be indicated, e.g., in addition to the negative indication shown in the last record of Table 2, positive indications could be associated with a tag 215 to indicate a user's heightened level of interest in the tag 215. For example, the user could be a Star Wars fan, but also could be an extreme fan of the character Chewbacca, wanting to see scenes including Chewbacca wherever possible.

Modification data 126 provides information for modifying standard content 111 based on collected user data 125. In general, modification data 126 is based on an association of data included in metadata 113 with data included in user data 125. A process for generating modification data 126 is discussed below with respect to FIG. 5. Moreover, Table 3 provides an example of modification data 126, which could take various other formats.

TABLE 3

| No. | Segment ID | Start Index | End Index | Next Record |
|---|---|---|---|---|
| 1 | NULL | 001043 | 001178 | NULL |
| 2 | ABC | 010201 | 012201 | NULL |
| 3 | CDEF | 208767 | 230983 | 4 |
| 4 | BCD | 230983 | 230983 | NULL |

As seen in record no. 1 of exemplary Table 3, modification data 126 could provide information relating to a portion of standard content 111 to be deleted when the content 111 is played on media device 120 and/or display 121. That is, instead of a segment 112 identifier being provided, a null value is indicated. Thus, the modification data 126 indicates that media units 205 between the specified starting and ending indices should be removed when the content 111 is displayed for a user. Further, modification data 126 could provide information relating to one or more optional segments 112 to be inserted into the content 111, as seen in records 2 and 3. In other words, record no. 2 indicates that the segment 112 having an identifier ABC should replace content 111 starting at index 010201 and ending at index 012201. Likewise, the segment 112 having an identifier CDEF should replace content 111 starting at index 208767 and ending at index 230983. In addition, record no. 3 indicates that the segment CDEF should be followed by the segment 112 indicated in record no. 4. Accordingly, record no. 4 indicates that the segment 112 having an identifier BCD should be inserted into the standard content 111 at index 230983.

A social media source 130 is generally a known social media provider, such as Facebook, Twitter, MySpace, LinkedIn, Google+, etc. In general, user data 135 includes data associated with a user that is available from a remote site such as a social media source 130. User data 135 may include data accessed from a user account on a remote site and/or data accessed about a user from the remote site. For example, social media sources 130 such as Twitter, Facebook, LinkedIn etc., may provide data 135 associated with a user without requiring a log-in to a user's account. Likewise, other remote sites may allow for access to user data 135, e.g., e-commerce sites such as Amazon.com, Netflix, etc., may provide data 135 about a user without requiring a login to the user's account on the remote site.

In cases where a user account is used to obtain user data 135, a user account on a social media source 130 can generally be accessed by providing a user login identifier and password. Logging in with such identifier and password generally provides access to user data 135. For example, logging in to a user's Facebook account provides access to the user's Facebook page and other account information, including a user's "likes," posts to the user's and other users' Facebook "walls," etc. Similarly, logging into a user's Twitter account provides access to other Twitter users that the user is "following." Further, a Twitter user's login information, or simply information relating to the user's Twitter "handle," provides a mechanism for following the user's "tweets." As discussed further below, such social media user data 135 may be used to identify tags 215 to be included in collected user data 125.

Exemplary Process Flows

Figures 3, 4:
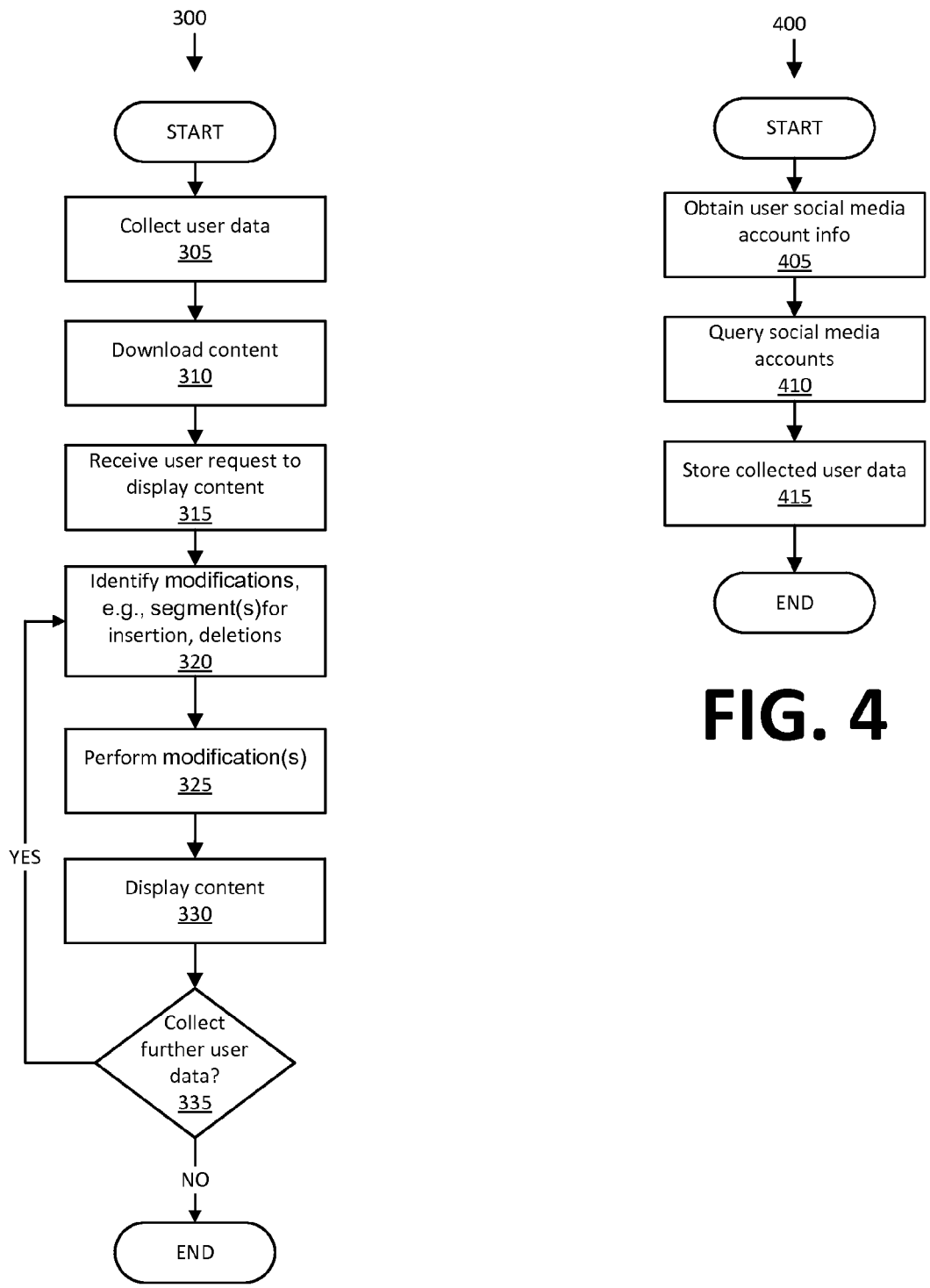
FIG. 3 is a diagram of an exemplary process for dynamically delivering media content.
FIG. 4 is a diagram of an exemplary process for collecting user data.

FIG. 3 is a diagram of an exemplary process 300 for dynamically delivering media content.

The process 300 begins in a block 305 in which user data 125 is collected from social media sources 130. FIG. 4, discussed below, provides details of an exemplary process 400 by which user data 125 is collected and stored by media device 120.

Next, in a block 310, media device 120 receives media content 110 from content source 105. Media content 110 may be received from the media content source 105 in a variety of ways, as mentioned above. For example, the media content 110 may be provided as a programming channel in a satellite or cable television system, or as video-on-demand in such a system. Further, as mentioned above, media content 110 could be provided on a computer readable medium included in or accessible by the media device 120, e.g., an optical disc such as a DVD (sometimes referred to as a digital video disk) or Blu-ray™ disc. In some cases, e.g., video-on-demand, media content 110 may be pushed to the media device 120 from the content source 105 to be available for user purchase, or video-on-demand media content 110 may be retrieved from the content source 105 when purchased. Further, media device 120 could receive media content 110 as a download of media data via a network such as the Internet.

Next, in a block 315, media device 120 receives a user request to display an item of media content 110. For example, a user may select a channel of satellite or cable programming, purchase a video-on-demand movie, stream a movie or video over the Internet or other network, etc.

Next, in a block 320, the media device 120 identifies modifications, if any, to be made to the standard content 111 in the media content 110 indicated in block 315. Identifying such modifications generally includes consulting modification data 126, discussed above with respect to Table 3 and below with respect to FIG. 5, to determine a portion or portions of the standard content 111 to be modified. Further, optional segments 112 to be inserted into the standard content 111, locations of such insertions, and whether the optional segment 112 is to replace, proceed, or follow a specified portion of the standard content 111, may be indicated by the modification data 126. Moreover, as noted above, modification data 126 could simply indicate that a specified portion or portions of the standard content 111 is to be deleted when the item be a content 110 is displayed to a user.

Next, in a block 325, the media device 120 performs the modifications to standard content 111 determined from block 320. That is, a first set of media data, the content 111, may be modified based at least in part on an association between the data 125 associated with the user and the metadata 113, such as may be indicated by modification data 126. For example, the media device 120 could remove a portion or portions of the content 111 and/or replace such portion or portions of the content 111 with a segment 112, etc.

Next, in a block 330, the modified standard content 111 is displayed, e.g., by media device 120, or as provided to the display device 121 by the media device 120.

Next, in a block 335, media device 120 determines whether further user data 125 has been collected. Block 335 is optional. In some implementations, the process 300 ends following step 330. However, it is possible to collect user data 125 while the content 111 is being displayed. For example, a user may be providing social media user data 135 while the content 111 is being displayed, e.g., by posting to a Facebook wall, sending a tweet via Twitter, etc. In such event, the media device 120 could query various social media sources 130, e.g., at regular intervals such as every two minutes, to determine if additional data 135 is present to be included in collected data 125. Additionally or alternatively, data may be "pushed" to the media device when additional data is available. If further data is collected, the process 300 returns to block 320. Otherwise, the process 300 ends following block 335, and after the content 111 has been displayed.

FIG. 4 is a diagram of an exemplary process 400 for collecting user data 125. The process 400 could be initiated via a variety of mechanisms. For example, a user of media device 120 could be provided with a user interface for manually initiating the collection of user data 125. Further, media device 120 could include an application, either initiated by a user or running automatically on startup, that periodically, e.g., once every thirty minutes, once every day, etc., initiates the process 400.

The process 400 begins in a block 405, in which the media device 120 obtains a user's account information, e.g., a login and password, for one or more social media sources 130. For example, a graphical user interface could be provided, e.g., in a web browser in a computer media device 120, in a screen presented in a display device 121 by a set-top box media device 120, etc., prompting a user to enter social media account information. Further, block 405 may not be executed every time the process 400 is carried out. Social media source 130 account information could be stored by the media device 120 so that a user need not provide such account information every time the process 400 is carried out.

Next, in a block 410, the social media source or sources 130 for which account information was provided in block

405 are queried. As mentioned above, such query generally includes obtaining social media user information 135 that can be used to generate tags 215. The process 400 generally operates under instructions tailored to a specific social media source 130 being queried. For example, querying a user's Twitter account could include searching for Twitter hashtags, identifying other Twitter accounts being followed by the user, searching a user's tweets for certain keywords, etc. Likewise, querying a user's Facebook account could include identifying other Facebook accounts that the user has "friended," searching for the user's "likes," etc. It should be understood that querying of other social media sources 130 could similarly be done in a fashion appropriate for the particular social media source 130, and the social media user data 135 available therein.

Next, in a block 415, social media user data 135 collected in block 410 is stored as collected user data 125. For example, media device 120 may include associated storage for storing the user data 125. In general, social media user data 135 may be analyzed for possible tags 215. For example, the media device 120 could store, or could obtain from a computing device such as a server within the content source 105, a list of tags 215 that could be included in content metadata 113 for various items of media content 110 that could be provided by the content source 105. The process 400 could then include determining whether social media user data 135 included data that may match a tag or tags 215. For example, a list of tags 215 stored by the media device 120 could include "Luke Skywalker." A user's social media user data 135 could indicate that the user had "liked" a Luke Skywalker-themed website through the user's Facebook account. This "like" could then be used to generate a "Luke Skywalker" tag 215 included in collected user data 125 for the user.

Following step 415, the process 400 ends. However, as mentioned above, the process 400 is generally repeated on a periodic basis, sometimes while a user is consuming an item of media content 110.

Further, variations in the process 400 are possible. For example, at least some of the process 400 could be carried out by a computing device included within the content source 105, rather than according to instructions stored on the media device 120. In one implementation, the process 400 could present a user interface, e.g., in a web browser or a screen presented by an application in a set top box or the like. Social media account information provided in block 405 could then be sent to the content source 105. The content source 105 could then perform querying of social media source 130 accounts and collection of social media user data 135. Further, the content source 105 could generate and store collected user data 125, and/or could provide social media user data 135 and/or collected user data 125 to media device 120 for analysis and/or storage.

Figure 5:
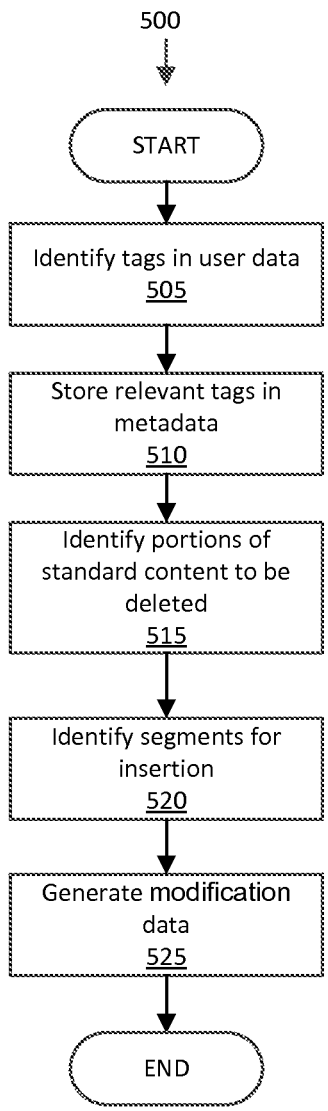
FIG. 5 is a diagram of an exemplary process for generating content modification data.

FIG. 5 is a diagram of an exemplary process 500 for generating content modification data 126. The process 500 could be carried out according to instructions stored and executed by a computing device within the content source 105 and/or the media device 120. The process 500 begins in a block 505, in which tags 215 stored in a user's collected user data are retrieved, e.g., from storage associated with the media device 120.

Next, in a block 510, the tags 215 retrieved in block 505 are used to identify tags 215 in metadata 113 of in an item of content 110 that has been requested by a user. In general, tags 215 in metadata 113 are identified where the tags 215 are related to tags 215 that have been generated from user data 135 and included in collected user data 125. That is, an association may be made between a first tag or tags 215 in metadata 113 relevant to a second tag or tags 215 in user data 125. For example, first and second tags 215 could be matched to one another, e.g., a "Luke Skywalker" tag 215 in metadata 113 could be matched to a "Luke Skywalker" tag in user data 125.

Further, tags 215 could be related even if they do not match. Thus, other logic could be used to make an association between user data 125 and metadata 113. For example, the process 500 could implement rules associating various tags 215 with one another. Consider an example in which user data 125 includes the first tag 215 "Star Wars," and metadata 113 includes the second tag 215 "Luke Skywalker." In this case, a rule could identify various Star Wars characters, including Luke Skywalker, as relevant to the "Star Wars" tag 215.

In any event, once associated tags 215 are identified in metadata 113, those tags 215, and locations in the standard content 111 associated with the tags 215, are stored as records in modification data 126, e.g., as seen above in Table 3. Further, as mentioned above, tags 215 could be marked to indicate whether a user's association with the tag 215 was positive or negative. For example, a tag in metadata 113 could indicate that a portion of standard content 111 included extreme violence. A tag in user data 125 could indicate that the user dislikes violent content. In this case, the metadata 113 tag 215 could be marked in modification data 126 to indicate that a user feels negatively about the tag 215.

Next, in a block 515, portions of standard content 111 to be deleted, if any, are identified. For example, a tag 215 stored in block 510 could indicate that a user dislikes violent content, where a portion of standard content 111 included extreme violence. In that case, a portion of standard content 111 indicated by a tag or tags 215 in metadata 113 could be indicated in modification data 126 to be deleted or removed when the item of media content 110 is displayed.

Next, in a block 520, segments 112 associated with a tag or tags 215 identified in block 505 are added to modification data 126, e.g., in a record or records along with the tag or tags 215 and the data indicating a location in standard content 111 at which the segment 112 is to be inserted. For example, as discussed above concerning Table 3, a segment 112 could be inserted into standard content 111 by replacing a portion of the standard content 111. In that case, the portion of the standard content 111 to be replaced would be indicated in the modification data 126, e.g., according to indices, pointers 210 etc., included in metadata 113. Further, a segment 112 could be added at a location in standard content 111 without replacing any portion of the standard content 111. At least one way of indicating this kind of addition as discussed above in regard to Table 3.

Next, in a block 525, modification data 126 is stored by media device 120, e.g., in a memory, storage device, etc.

Following block 525, the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
   collecting data associated with a user from a plurality of remote sites;
   receiving a set of media content data that includes a first subset of media data including unmodified standard content media data and associated standard content metadata, as well as a second subset of media data that includes a plurality of optional segments of media data each with respective segment metadata, wherein the respective metadata of each of the segments specifies a start index and an end index of the standard content for insertion of the respective segment, and further wherein the start index of a first segment in the plurality of optional segments is also the end index of the first segment;
   making an association between the data associated with the user and the standard content metadata;
   using the association between the standard content metadata and the user data collected from the plurality of remote sites to identify at least one of the segments of media data; and
   modifying the standard content media data to insert the identified at least one segment at the start index and the end index of the identified at least one segment.

2. The method of claim 1, further comprising:
   identifying, from the data associated with a user, a first set of one or more tags; and
   identifying, from the standard content metadata, a second set of one or more tags;
   wherein making the association between the data associated with the user and the standard content metadata includes determining that a tag in the first set of tags is related to a tag in the second set of tags.

3. The method of claim 2, wherein the index specified in the at least one optional segment of media data is associated with the tag that is identified in the second set of tags.

4. The method of claim 1, wherein modifying the standard content media data includes deleting a portion of the first set of media data.

5. The method of claim 1, further comprising displaying the first set of media data.

6. The method of claim 5, further comprising, while displaying the first set of media data:
   retrieving additional data associated with the user from one or more remote sites;
   making a second association between the additional data associated with the user and the standard content metadata; and
   further modifying the standard content media data based at least in part on the second association between the additional data associated with the user and the standard content metadata.

7. A system, comprising computing device that includes a processor and a memory, the memory storing instructions that are executable by the processor, the instructions including instructions for:
   collecting data associated with a user from a plurality of remote sites;
   receiving a set of media content data that includes a first subset of media data including unmodified standard content media data and associated standard content metadata, as well as a second subset of media data that includes a plurality of optional segments of media data each with respective segment metadata, wherein the respective metadata of each of the segments specifies a start index and an end index of the standard content for insertion of the respective segment, and further wherein the start index of a first segment in the plurality of optional segments is also the end index of the first segment;

making an association between the data associated with the user and the standard content metadata;

using the association between the standard content metadata and the user data collected from the plurality of remote sites to identify at least one of the segments of media data; and modifying the standard content media data to insert the identified at least one segment at the start index and the end index of the identified at least one segment.

8. The system of claim 7, the instructions further comprising instructions for:

identifying, from the data associated with a user, a first set of one or more tags; and identifying, from the standard content metadata, a second set of one or more tags;

wherein making the association between the data associated with the user and the standard content metadata includes determining that a tag in the first set of tags is related to a tag in the second set of tags.

9. The system of claim 8, wherein the index specified in the at least one optional segment of media data is associated with the tag that is identified in the second set of tags.

10. The system of claim 7, wherein modifying the standard content media data includes deleting a portion of the first set of media data.

11. The system of claim 7, the instructions further comprising instructions for providing the first set of media data to a display.

12. The system of claim 11, further comprising instructions for, while displaying the first set of media data:

retrieving additional data associated with the user from one or more remote sites;

making a second association between the additional data associated with the user and the standard content metadata; and further modifying the standard content media data based at least in part on the second association between the additional data associated with the user and the standard content metadata.

13. A system, comprising a computing device that includes a processor and a memory, the memory storing instructions that are executable by the processor, the instructions including instructions for:

obtaining user account information from a plurality of accounts of a user, each of the plurality of accounts stored on one of a plurality of remote sites;

storing data from user activity related to more than one of the remote site user accounts;

comparing the user activity data from more than one of the remote site user accounts to metadata associated with at least some of a plurality of media units of standard content media data to identify at least one optional first segment of media data not included in the media units, the identified at least one optional first segment specifying an index in the media units for insertion of the identified segment, wherein the start index of the first optional segment in the plurality of optional segments is also the end index of the first optional segment;

receiving a request for playback of the media units; and modifying the playback according to the comparing by inserting the identified first optional segment into the media units.

14. The system of claim 13, the instructions further comprising instructions for:

storing the user activity data as a first set of one or more tags;

wherein comparing the user activity data to metadata associated with at least some of a plurality of media units includes comparing tags in the first set of tags with tags in a second set of one or more tags, the second set of tags being included in the metadata.

15. The system of claim 14, the instructions further comprising instructions for:

identifying at least one media unit associated with a tag that is identified in the second set of tags as a result of the comparing;

wherein modifying the playback is further based on the media unit.

16. The system of claim 13, wherein modifying the playback includes deleting a at least one media unit from the set of media units.

17. The system of claim 13, the instructions further comprising instructions for providing the first set of media data to a display.

18. The system of claim 13, further comprising instructions for, during the playback:

retrieving additional user activity data;

comparing the additional user activity data to metadata associated with at least some of the plurality of media units; and further modifying the playback according to the comparing of the additional user activity data to metadata associated with at least some of the plurality of media units.

19. The method of claim 1, wherein the start index of a second segment in the plurality of optional segments is different from the end index of the second segment, whereby modifying the standard content by inserting the identified at least one segment includes at least one of adding the at least one segment to the standard content and replacing a portion of the standard content with the at least one segment.

20. The system of claim 7, wherein the instructions further include instructions to detect that a start index of a second segment in the plurality of optional segments is different from the end index of the second segment, whereby modifying the standard content by inserting the identified at least one segment includes at least one of adding the at least one segment to the standard content and replacing a portion of the standard content with the at least one segment.

21. The system of claim 13, wherein the instructions further include instructions to detect that a start index of a second identified optional segment is different from the end index of the second segment, and to modify the playback according to the comparing by inserting the identified second optional segment into the media units.

* * * * *